United States Patent
Zink

(10) Patent No.: US 9,731,597 B2
(45) Date of Patent: Aug. 15, 2017

(54) DISCONNECTABLE DRIVELINE WITH BRAKE SYSTEM

(71) Applicant: American Axle & Manufacturing, Inc., Detroit, MI (US)

(72) Inventor: Frederick E. Zink, Capac, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 63 days.

(21) Appl. No.: 14/967,406

(22) Filed: Dec. 14, 2015

(65) Prior Publication Data

US 2017/0166050 A1 Jun. 15, 2017

(51) Int. Cl.
*B60K 17/354* (2006.01)
*B60K 17/16* (2006.01)
*F16H 37/08* (2006.01)
*B60K 17/344* (2006.01)

(52) U.S. Cl.
CPC .......... *B60K 17/165* (2013.01); *B60K 17/344* (2013.01); *B60K 17/354* (2013.01); *F16H 37/0813* (2013.01)

(58) Field of Classification Search
None
See application file for complete search history.

(56) References Cited

U.S. PATENT DOCUMENTS

| 4,269,293 | A | 5/1981 | Martin | |
| 7,562,753 | B2* | 7/2009 | Ima | B60K 17/344 192/103 R |
| 8,596,436 | B2 | 12/2013 | Grogg et al. | |
| 8,608,611 | B2* | 12/2013 | Ekonen | B60K 17/35 475/221 |
| 9,371,869 | B2* | 6/2016 | Fukuda | B60K 17/344 |
| 9,376,014 | B2* | 6/2016 | Maeda | B62D 11/003 |
| 2008/0047798 | A1 | 2/2008 | Wittkopp et al. | |

* cited by examiner

*Primary Examiner* — Dirk Wright
(74) *Attorney, Agent, or Firm* — Harness, Dickey & Pierce, P.L.C.

(57) ABSTRACT

A disconnectable vehicle driveline having front and rear axle assemblies and a power take-off unit (PTU). The PTU includes a coupling, which is configured to selectively transmitting rotary power between an input shaft and a first gear, and a brake element. The coupling includes a first coupling portion, which is coupled to the input shaft for rotation therewith, and a second coupling portion that is coupled to the first gear for common rotation. The second coupling portion can be translated into and out of engagement with the first coupling portion. The brake element is configured to engage the second coupling portion when the second coupling portion is not engaged to the first coupling portion to thereby resist rotation of the first gear and elements of the vehicle driveline that are drivingly coupled to the first gear.

21 Claims, 2 Drawing Sheets

DISCONNECTABLE DRIVELINE WITH BRAKE SYSTEM

FIELD

Figure 1:
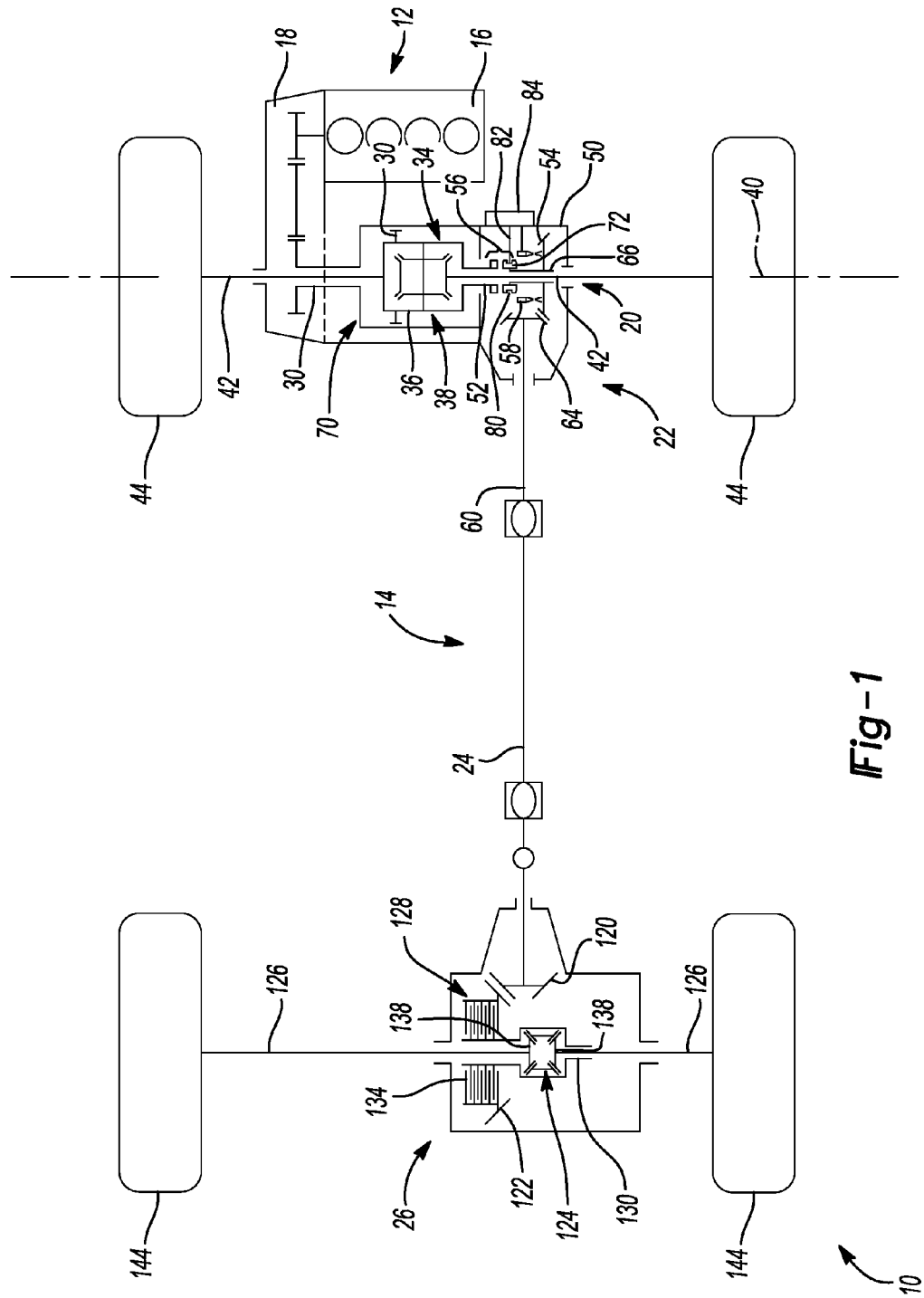

The present disclosure relates to a disconnectable driveline having a brake system.

BACKGROUND

This section provides background information related to the present disclosure which is not necessarily prior art.

Many modern automotive vehicles, such as crossover vehicles, are available with an all-wheel drive (AWD) drivetrain that is based on a front-wheel drive (FWD) architecture. This optional drivetrain arrangement permits drive torque to be selectively and/or automatically transferred from the powertrain to both the primary (i.e., front) driveline and the secondary (i.e., rear) driveline to provide better traction when the vehicle is operated in inclement weather and on off-highway road conditions. Such AWD vehicles necessarily are equipped with a much more complex drivetrain which, in addition to the primary driveline, must include the additional components associated with the secondary driveline such as a power take-off unit and a propshaft.

In an effort to minimize driveline losses (i.e., viscous drag, friction, inertia and oil churning) associated with secondary driveline being back-driven when no drive torque is transmitted thereto, it is known to incorporate a disconnect system that is configured to uncouple components of the secondary driveline such as, for example, the rear wheels or the rear differential from the remainder of the secondary driveline. We have found that portions of the disconnect systems provided by some suppliers are not capable of completely disconnecting in a relatively quick manner and as such, there are some situations where they will continue to transmit some (relatively small) amount of rotary power at time where the disconnect system is being operated to inhibit the transmission of rotary power. Accordingly, there remains a need in the art for an improved disconnectable driveline for use in an AWD vehicle.

SUMMARY

This section provides a general summary of the disclosure, and is not a comprehensive disclosure of its full scope or all of its features.

In one form, the present teachings provide a vehicle driveline that includes a housing, an input shaft mounted in the housing for rotation about a first axis, a differential case coupled to the input shaft for rotation about the first axis, a differential gearset received in the differential case, a first gear received in the housing and rotatable about the first axis, a coupling, a brake element and an output shaft. The coupling has a first coupling portion, which is coupled to the input shaft for rotation therewith, and a second coupling portion that is axially slidably but non-rotatably coupled to the first gear. The second coupling portion is movable along the first axis between a first coupling position, in which rotary power is transmittable between the input shaft and the first gear, and a second coupling position in which rotary power is not transmittable between the input shaft and the first gear. The brake element is coupled to the housing and is engagable to the second coupling portion when the second coupling portion is in the second coupling position to resist rotation of the second coupling portion relative to the housing. The output shaft is drivingly coupled to the first gear and is rotatable about a second axis that is not parallel to the first axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
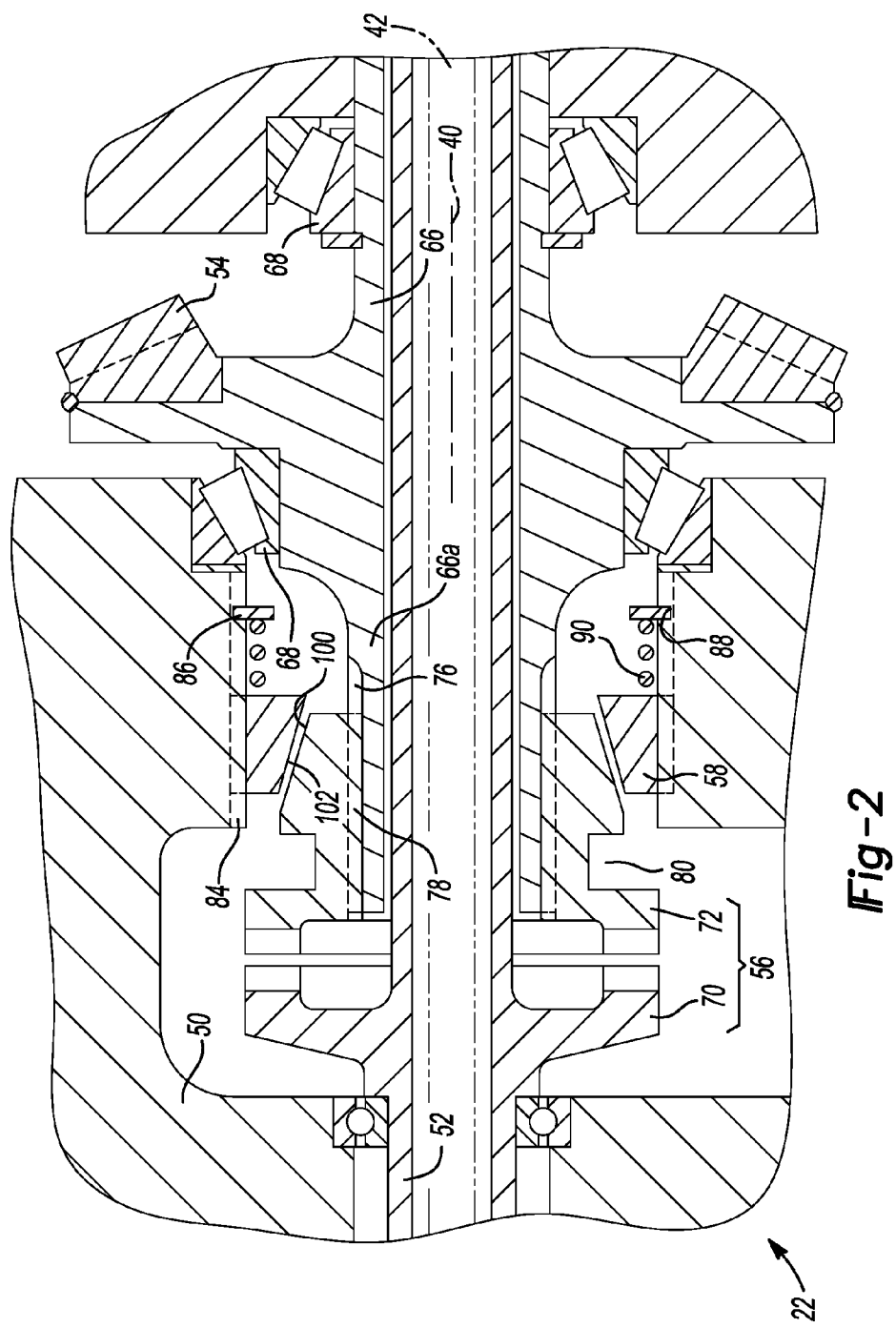

FIG. 1 is a schematic illustration of an exemplary vehicle constructed in accordance with the teachings of the present disclosure; and FIG. 2 is a section view of a portion of the vehicle of FIG. 1 illustrating a portion of a power take-off unit in more detail.

Corresponding reference numerals indicate corresponding parts throughout the several views of the drawings.

DETAILED DESCRIPTION

With reference to FIG. 1 of the drawings, an exemplary vehicle constructed in accordance with the teachings of the present disclosure is generally indicated by reference numeral 10. The vehicle 10 can have a power train 12 and a drive train or driveline 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the driveline 14. The transmission 18 can have a plurality of automatically or manually-selected gear ratios.

The driveline 14 can include a front axle assembly 20, a power take-off unit (PTU) 22, a propshaft 24 and a rear axle assembly 26. An output of the transmission 18 can be drivingly coupled to an input 30 of the front axle assembly 20. The front axle assembly 20 can include a front or first differential assembly 34 that can include a front or first differential case 36 and a front or first differential gearset 38. The first differential case 36 is rotatable about a first rotary axis 40. In the example provided, the first differential assembly 34 is configured to distribute rotary power from the first differential case 36 to a pair of front or first axle shafts 42 on a full-time basis to drive an associated pair of front or first wheels 44.

With reference to FIGS. 1 and 2, the PTU 22 can comprise a housing 50, an input shaft 52, a first gear 54, a coupling 56, a brake element 58 and an output shaft 60. The housing 50 can be configured to house the other components of the PTU 22 and optionally can be configured to house all or a portion of the front axle assembly 20. Accordingly, it will be appreciated that the housing 50 can comprise a plurality of discrete housing components (not specifically shown) that can be assembled together to form the housing 50. The input shaft 52 can be fixedly coupled to the first differential case 36 for common rotation about the first rotary axis 40.

The first gear 54 can be rotatable about the first rotary axis 40. In the example provided, the first gear 54 is a type of bevel gear, such as a straight bevel gear, a spiral bevel gear or a hypoid gear, and is configured to cooperate with another gear (i.e., a pinion gear 64 that is fixedly coupled to the output shaft 60) to direct rotary power along a generally perpendicular power transmission path. Alternatively, the first gear 54 could be a spur or helical gear (not shown) that is configured to transmit rotary power along a transmission path that employs one or more pairs of gears having parallel rotational axes. An example of this latter type of PTU is shown in commonly assigned U.S. Pat. No. 8,047,323, the disclosure of which is incorporated by reference as if fully set forth in detail herein. In the particular example provided, the first gear 54 is mounted on a hollow spool 66 that is supported for rotation relative to the housing 50 by a pair of bearings 68 (FIG. 2), which can comprise one or more angular ball bearings and/or one or more tapered roller bearings and/or a four-point angular contact bearing. One of the first axle shafts 42 can be received through the spool 66 and the first gear 54. The coupling 56 can be any type of device that can be employed to selectively transmit rotary power between the input shaft 52 and the first gear 54, such as a friction clutch (not shown) or a toothed collar (not shown) that can be slid axially along the first rotary axis 40 to selectively engage a toothed member (not shown) that is coupled for rotation with the input shaft 52.

With specific reference to FIG. 2, the coupling 56 in the particular example provided is a claw or dog clutch. The coupling 56 can generically include a first coupling portion 70 (e.g., a first clutch dog), which can be coupled to the input shaft 52 for common rotation, and a second coupling portion 72 (e.g., a second clutch dog) that can be non-rotatably coupled to the first gear 54 for common rotation but axially slidable along the first rotary axis 40 relative to the first gear 54. In the example provided, a cantilevered portion 66a of the spool 66 extends along the first axis from the first gear 54 in a direction toward the first coupling portion 70 and includes a plurality of male or external spline teeth 76 that are engaged by a plurality of female or internal splined teeth 78 formed in the second coupling portion 72. Any type of actuator can be employed to translate the second coupling portion 72 between a first coupling position, in which the second coupling portion 72 is drivingly coupled to the first coupling portion 70 to permit the transmission of rotary power between the input shaft 52 and the first gear 54, and a second coupling position in which the second coupling portion 72 is disengaged from the first coupling portion 70 to thereby inhibit the transmission of rotary power between the input shaft 52 and the first gear 54. In the example provided, the second coupling portion 72 defines a clutch fork groove 80 that is configured to receive a conventional clutch fork 82 (FIG. 1) that can be translated by any appropriate mechanism, such as a linear motor 84 (FIG. 1).

The brake element 58 can be non-rotatably coupled to the housing 50 and engagable to the second coupling portion 72 when the second coupling portion 72 is decoupled from the first coupling portion 70 and moved toward the second coupling position. In the example provided, the brake element 58 is mounted to the housing 50 for sliding movement along the first rotary axis 40 and is biased by a spring 90 in a direction along the first rotary axis 40 toward the second coupling portion 72. Contact between a first stop element 84, which could be integrally formed with the housing 50, and the brake element 58 can limit movement of the brake element 58 in the direction along the first rotary axis 40 toward the second coupling portion 72 so that the brake element 58 cannot engage the second coupling portion 72 when the second coupling portion 72 is in the first coupling position. Contact between a second stop element 86, which can comprise a snap ring that is received into a groove 88 in the housing 50, can restrain an end of the spring 90 on a side opposite the brake element 58.

The second coupling portion 72 can include a first friction surface 100 that can engage a second friction surface 102 formed on the brake element 58 when the brake element 58 and the second coupling portion 72 are engaged to one another. In the example shown, the first and second friction surfaces 100 and 102 have a frusto-conical shape, but it will be appreciated that the first and second friction surfaces 100 and 102 can be shaped differently. Moreover, the first friction surface 100 and/or the second friction surface 102 can be configured with a desired set of tribological properties to control friction, lubrication and wear between the first and second friction surfaces 100 and 102 when the brake element 58 and the second coupling portion 72 are engaged to one another. In this regard, the material from which the first friction surface 100 and/or second friction surface 102 is formed (including base materials and any subsequent coatings), the heat treatment and surface finish of the first and second friction surfaces 100 and 102, and/or the use of a friction material or layer with one or both of the first and second friction surfaces 100 and 102 can be employed to provide a desired level of friction, wear resistance and lubrication control.

Returning to FIG. 1, the output shaft 60 is rotatable about a second rotary axis (coincident with the output shaft 60 that is schematically shown in FIG. 1) that can be generally perpendicular to the first rotary axis 40. The output shaft 60 can be drivingly coupled to a first end of the propshaft 24.

The propshaft 24 is configured to transmit rotary power between the output shaft 60 of the PTU 22 and an input pinion 120 associated with the rear axle assembly 26. The rear axle assembly 26 can further include a ring gear 122, a rear or second differential assembly 124, a pair of rear or second axle shafts 126, and a disconnect system 128. The ring gear 122 can be meshingly engaged with the input pinion 120. The second differential assembly 124 can include a second differential case 130 and a pair of differential output members 138. Each of the differential output members 138 is configured to drive an associated one of the second axle shafts 126. The disconnect system 128 can comprise one or more couplings that is selectively operable to inhibit the transmission of vehicle propulsive power from the propshaft 24 to at least one of the second axle shafts 126. In the example provided, the disconnect system 128 comprises a friction clutch 134 that is employed to selectively couple the ring gear 122 to the second differential case 130, but it will be appreciated that the disconnect system 128 could be configured differently. For example, the friction clutch 134 could be disposed between the propshaft 24 and the input pinion 120, or between one of the differential output members 138 and its associated second axle shaft 126. Alternatively, the disconnect system 128 could additionally or alternatively employ another type of coupling, such as a dog or claw clutch. As another alternative, the disconnect system 128 could be an integral part of the second differential assembly124 (e.g., the second differential assembly 124 could comprise a pair of friction clutches, with each friction clutch being configured to control the transmission of rotary power to an associated one of the second axle shafts 126).

At times during the operation of the vehicle 10 when the coupling 56 in the PTU 22 is disengaged (i.e., the second coupling portion 72 is in the second coupling position) and the disconnect system 128 is operated so that vehicle propulsive power cannot be transmitted from the propshaft 24 to the at least one of the second axle shafts 126, some rotary power (i.e., torque) may nevertheless be transmitted through the disconnect system 128, albeit an amount that would be insufficient to propel the vehicle 10. In such instances, a pair of rear wheels 144 of the vehicle 10 provide rotary power that is transmitted in an amount that would ordinarily cause corresponding rotation of the propshaft 24. Because the brake element 58 is engaged to the second coupling portion 72, however, rotation of the propshaft 24 in such situations is prevented. In this regard, the friction between the first and second friction surfaces 100 and 102 (FIG. 2) on the second coupling portion 72 and the brake element 58 resists rotation of the spool 66 and the first gear 54, thereby resisting rotation of the output shaft 60 of the PTU 22 and the propshaft 24 that is rotatably coupled to the output shaft 60.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline comprising:
  a housing;
  an input shaft mounted in the housing for rotation about a first axis;
  a differential case coupled to the input shaft for rotation about the first axis;
  a differential gearset received in the differential case;
  a first gear received in the housing and rotatable about the first axis;
  a coupling having first and second coupling portions, the first coupling portion being coupled to the input shaft for rotation therewith, the second coupling portion being axially slidably but non-rotatably coupled to the first gear, the second coupling portion being movable along the first axis between first and second coupling positions, wherein rotary power is transmittable between the input shaft and the first gear when the second coupling portion is disposed in the first coupling position, and wherein rotary power is not transmittable between the input shaft and the first gear when the second coupling portion is disposed in the second coupling position;
  a brake element coupled to the housing and engagable to the second coupling portion when the second coupling portion is in the second coupling position to thereby resist rotation of the second coupling portion relative to the housing; and
  an output shaft drivingly coupled to the first gear, the output shaft being rotatable about a second axis that is not parallel to the first axis.

2. The vehicle driveline of claim 1, further comprising an axle shaft driven by the differential gearset and received through the input shaft and the first gear.

3. The vehicle of claim 1, wherein the coupling is a clutch.

4. The vehicle of claim 3, wherein the clutch is a dog clutch.

5. The vehicle of claim 1, wherein the second coupling portion is a sleeve having a plurality of first teeth that are slidably engaged to second teeth that are fixedly coupled to the first gear.

6. The vehicle of claim 5, wherein the first teeth are internal teeth.

7. The vehicle of claim 1, wherein the brake element is slidably coupled to the housing.

8. The vehicle of claim 7, wherein a spring biases the brake element toward the second coupling portion.

9. The vehicle of claim 1, wherein the second coupling portion comprises a first friction surface that engages a second friction surface formed on the brake element.

10. The vehicle of claim 9, wherein the first and second friction surfaces are frusto-conically shaped.

11. The vehicle of claim 1, wherein the first gear is a ring gear, wherein a pinion gear is mounted on the output shaft, and wherein the ring gear is meshingly engaged to the pinion gear.

12. The vehicle of claim 1, wherein the first gear is mounted on a spool, wherein a pair of bearings support the spool for rotation relative to the housing, wherein the second coupling portion is received on a cantilevered portion of the spool that extends toward the first coupling portion.

13. A vehicle driveline comprising:
  a first differential assembly having a first differential case and a first differential gearset received in the case, the first differential case being rotatable about a first axis;
  a power take-off unit having a housing, an input shaft, a first gear, a first coupling, a brake element and an output shaft, the input shaft being mounted in the housing for rotation about the first axis and being coupled to the first differential case for rotation therewith, the first gear being received in the housing and rotatable about the first axis, the first coupling having first and second coupling portions, the first coupling portion being coupled to the input shaft for rotation therewith, the second coupling portion being axially slidably but non-rotatably coupled to the first gear, the second coupling portion being movable along the first axis between first and second coupling positions, wherein rotary power is transmittable between the input shaft and the first gear when the second coupling portion is disposed in the first coupling position, and wherein rotary power is not transmittable between the input shaft and the first gear when the second coupling portion is disposed in the second coupling position, the brake element being coupled to the housing and engagable to the second coupling portion when the second coupling portion is in the second coupling position to thereby resist rotation of the second coupling portion relative to the housing, the output shaft being drivingly coupled to the first gear, the output shaft being rotatable about a second axis that is not parallel to the first axis;
  a propshaft coupled to the output shaft for rotation therewith;
  an axle assembly having an input pinion, a ring gear, a second differential assembly and a pair of axle shafts, the input pinion being coupled to the propshaft for rotation therewith, the ring gear being meshingly engaged to the input pinion, the second differential assembly comprising a second differential case that is coupled to the ring gear for rotation therewith, the second differential assembly having a pair of differential output members configured to drive a corresponding one of the axle shafts; and
  a disconnect system having a second coupling between the propshaft and one of the axle shafts, the disconnect system being operable in a first condition that permits transmission of vehicle propulsive power from the propshaft to the one of the axle shafts, and a second condition that inhibits transmission of vehicle propulsive power from the propshaft to the one of the axle shafts.

14. The vehicle of claim 13, wherein the first coupling is a clutch.

15. The vehicle of claim 14, wherein the clutch is a dog clutch.

16. The vehicle of claim 13, wherein the second coupling portion is a sleeve having a plurality of first teeth that are slidably engaged to second teeth that are fixedly coupled to the first gear.

17. The vehicle of claim 13, wherein the brake element is slidably coupled to the housing.

18. The vehicle of claim 17, wherein a spring biases the brake element toward the second coupling portion.

19. The vehicle of claim 13, wherein the second coupling portion comprises a first friction surface that engages a second friction surface formed on the brake element.

20. The vehicle of claim 19, wherein the first and second friction surfaces are frusto-conically shaped.

21. The vehicle of claim 13, wherein the first gear is one of a bevel ring gear, a spiral bevel ring gear and a hypoid ring gear, wherein a pinion gear is mounted on the output shaft, and wherein the first gear is meshingly engaged to the pinion gear.

* * * * *